(12) United States Patent
Jung et al.

(10) Patent No.: US 11,999,358 B2
(45) Date of Patent: Jun. 4, 2024

(54) SYSTEM AND METHOD FOR DETERMINING DRIVER'S INEBRIATION

(71) Applicant: HYUNDAI MOBIS CO., LTD., Seoul (KR)

(72) Inventors: Yu Jin Jung, Uiwang-si (KR); June Seung Lee, Yongin-si (KR); Chang Won Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 275 days.

(21) Appl. No.: 17/718,583

(22) Filed: Apr. 12, 2022

(65) Prior Publication Data

US 2022/0340144 A1 Oct. 27, 2022

(30) Foreign Application Priority Data

May 3, 2021 (KR) .......................... 10-2021-0057400
May 21, 2021 (KR) .......................... 10-2021-0065534

(51) Int. Cl.
*B60W 40/08* (2012.01)
*B60K 28/06* (2006.01)
*B60W 60/00* (2020.01)

(52) U.S. Cl.
CPC ........... *B60W 40/08* (2013.01); *B60K 28/063* (2013.01); *B60W 60/0059* (2020.02); *B60W 2040/0836* (2013.01); *B60W 2420/403* (2013.01); *B60W 2540/223* (2020.02)

(58) Field of Classification Search
CPC ................. B60K 28/063; B60K 31/16; B60W 2040/0836; B60W 2420/403; B60W 2540/223; B60W 40/08; B60W 60/0059
See application file for complete search history.

(56) References Cited

U.S. PATENT DOCUMENTS

| 11,257,162 B1* | 2/2022 | Saban ..................... G06Q 40/08 |
| 2008/0254417 A1* | 10/2008 | Mohamed ................ G09B 9/04 434/69 |
| 2013/0206495 A1* | 8/2013 | Westbrook ........... B60K 28/063 180/272 |
| 2016/0081587 A1* | 3/2016 | Ghazarian .............. G06V 20/59 600/301 |
| 2019/0217865 A1* | 7/2019 | Nothacker ............ B60W 50/12 |
| 2021/0323451 A1* | 10/2021 | Fam ..................... B60N 2/2806 |
| 2021/0338146 A1* | 11/2021 | Pham ................... A61B 5/0205 |

FOREIGN PATENT DOCUMENTS

| KR | 10-2009-0095747 A | 9/2009 |
| KR | 10-2015230 B1 | 8/2019 |

* cited by examiner

*Primary Examiner* — Tyler J Lee
(74) *Attorney, Agent, or Firm* — Novo TechIP International PLLC

(57) ABSTRACT

Disclosed is a system and method for determining a driver's inebriation in a vehicle. The system includes a breathalyzer configured to be provided in an interior space of the vehicle to determine whether the driver is inebriated, through a driver's exhalation; and a controller configured to output a movement request signal for a driver's seat when determination of driver's inebriation by the breathalyzer is required and to control the breathalyzer to start the determination of driver's inebriation when the movement of the driver's seat is completed.

20 Claims, 9 Drawing Sheets

SYSTEM AND METHOD FOR DETERMINING DRIVER'S INEBRIATION

CROSS-REFERENCE TO RELATED APPLICATIONS

This application is based on and claims priority under 35 U.S.C. 119 to Korean Patent Application Nos. 10-2021-0047276, filed on Apr. 12, 2021; 10-2021-0057400, filed on May 3, 2021, and 10-2021-0065534 filed on May 21, 2021, in the Korean Intellectual Property Office, the disclosure of which is herein incorporated by reference in its entirety.

BACKGROUND

1. Technical Field

The disclosure relates to a system and a method for determining a driver's inebriation and, more specifically, to a system and a method for determining a driver's inebriation, wherein a breathing test for determining a driver's inebriation may be performed accurately and comfortably by moving the driver's seat.

2. Discussion of Related Art

A breathalyzer is provided to determine whether a driver is inebriated inside a vehicle. The driver may determine inebriation of the driver before or during driving, thereby self-confirming whether he/she is inebriated before or during driving.

Conventional technology for determining whether a vehicle driver is inebriated is not of a vehicle-integrated type using a car remote control, and it is thus not important to maintain the driver's posture appropriate for the determination.

Such conventional technology for determining inebriation has a problem in that, regardless of a signal requesting movement of the driver's seat, the driver needs to manually move to the position for breathing test by the breathalyzer. There is another problem in that the driver has difficulty in concentrating on driving, if required to manually move to the breathing test position.

The above descriptions regarding background technologies have been made only to help understanding of the background of the disclosure, and are not to be deemed by those skilled in the art to correspond to already-known prior arts.

SUMMARY

Accordingly, it is an aspect of the disclosure to provide an inebriation determination device wherein a breathalyzer is controlled to start inebriation determination when movement of a driver's seat is completed in response to output of a signal requesting movement of the driver's seat.

In accordance with an aspect, the disclosure provides a system for determining a driver's inebriation in a vehicle, the system including: a breathalyzer configured to be provided in an interior space of the vehicle to determine whether a driver is inebriated, through a driver's exhalation; and a controller configured to output a movement request signal for a driver's seat when determination of driver's inebriation by the breathalyzer is required and to control the breathalyzer to start the determination of driver's inebriation when the movement of the driver's seat is completed.

In an embodiment of the disclosure, the controller may output a signal for returning the driver's seat to its original position when the determination of whether the driver is inebriated is completed.

In an embodiment of the disclosure, the controller may output a movement request signal for the driver's seat through body information of the driver.

In an embodiment of the disclosure, when the body information of the driver is stored in a database of the vehicle, the controller may output the movement request signal for the seat to move the seat to a position stored in the database and matched to the driver.

In an embodiment of the disclosure, when the position of the seat stored in the database is changed or a new driver is recognized, the controller may update the database after the movement of the driver's seat is completed.

In an embodiment of the disclosure, when the driver's body information is not stored in the database of the vehicle, the controller may output the movement request signal for the seat by detecting the driver's body information or directly receiving the body information from the driver.

In an embodiment of the disclosure, when the body information of the driver is not detected or when the body information is not directly received from the driver, the controller may output the movement request signal for the seat by using average body information.

In an embodiment of the disclosure, although the driver's seat has moved according to the output movement request signal, the controller may again output the movement request signal for the driver's seat according to the driver's request.

In accordance with another aspect, the disclosure provides a method for determining a driver's inebriation in a vehicle, the method including: calculating, by a controller of the vehicle, a movement position of a driver's seat when determination of inebriation of the driver is required; outputting a movement request signal for the driver's seat to move the driver's seat to a position calculated by the controller of the vehicle; and determining whether the driver is inebriated, by a breathalyzer through inhalation of the driver when the movement of the driver's seat is completed.

In an embodiment of the disclosure, the moving of the driver's seat may further include outputting a signal for returning the driver's seat to its original position when the determination of whether the driver is inebriated is completed.

In an embodiment of the disclosure, the calculating of the movement position of the driver's seat may include calculating the movement position through body information of the driver.

In an embodiment of the disclosure, the calculating of the movement position of the driver's seat may include using a position stored in a database and matched to the driver when the body information of the driver is stored in a database of the vehicle.

In an embodiment of the disclosure, the moving of the driver's seat may further include updating the database after the movement of the driver's seat is completed, when the position of the seat stored in the database is changed or a new driver is recognized.

In an embodiment of the disclosure, the calculating of the movement position of the driver's seat may include calculating the movement position by detecting the body information of the driver or directly receiving the body information from the driver, when the body information of the driver is not stored in the database of the vehicle.

In an embodiment of the disclosure, the calculating of the movement position of the driver's seat may further include, when the body information of the driver is not detected or when the body information is not directly received from the driver, calculating the movement position by using average body information.

According to the system and method for determining a driver's inebriation, breathing test for determining a driver's inebriation may be performed accurately and comfortably by moving the driver's seat.

In addition, according to the system and method for determining a driver's inebriation, the driver is not required to manually move to the breathing test position, but the vehicle controller outputs a signal requesting movement of the driver's seat, and the driver thus can concentrate on driving.

Moreover, when the driver's body information is stored in the database of the vehicle, a seat movement request signal may be output such that the seat is moved to the position matching with the driver stored in the database. When the position of the seat stored in the database is changed or a new driver is recognized, the database may be updated after the movement of the driver's seat is completed, thereby controlling the seat in an optimal position.

Advantageous effects obtainable from the disclosure are not limited to the above-mentioned advantageous effects, and other advantageous effects not mentioned herein will be clearly understood by those skilled in the art to which the disclosure pertains.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, a system and method for determining a driver's inebriation according to various embodiments will be described in more detail with reference to the accompanying drawings.

Figure 1:
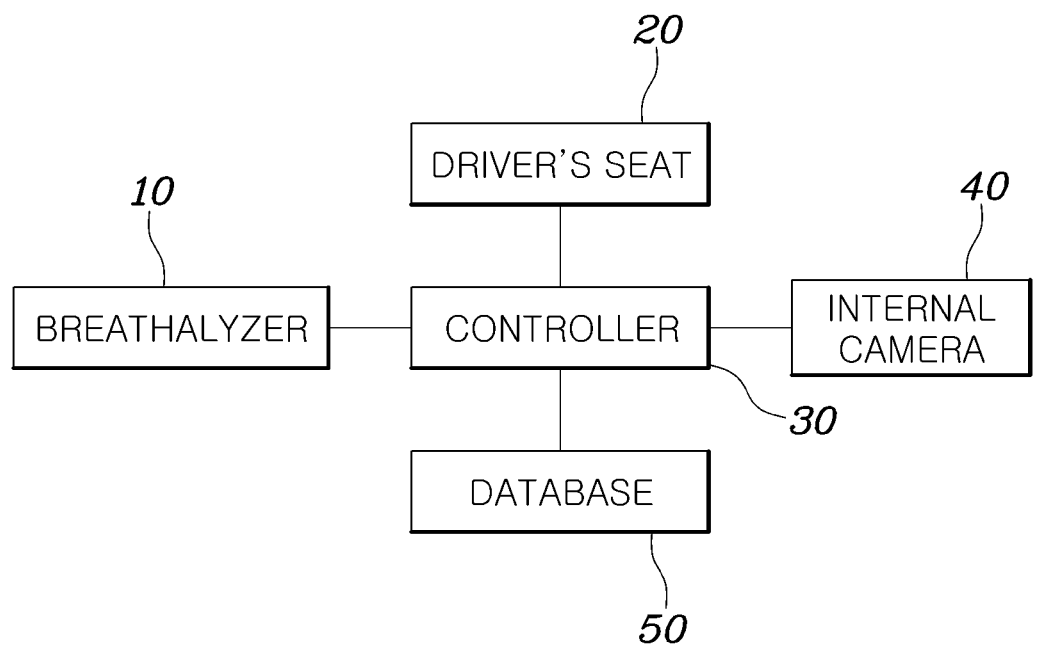
FIG. 1 is a simplified view illustrating a system for determining a driver's inebriation according to an embodiment of the disclosure.
Figure 2:
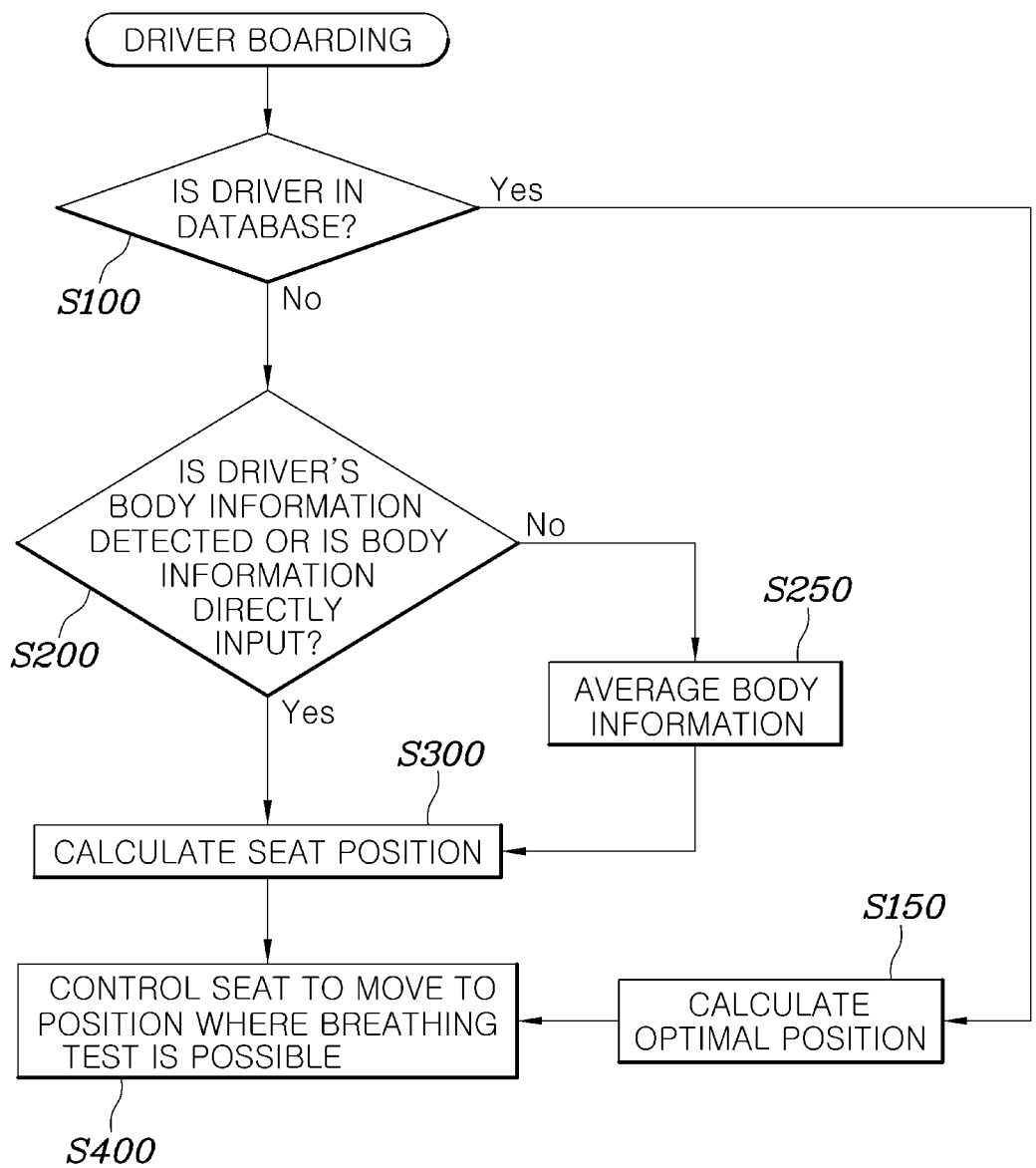
FIG. 2 is a flowchart illustrating a system for determining a driver's inebriation according to an embodiment of the disclosure.
Figure 3:
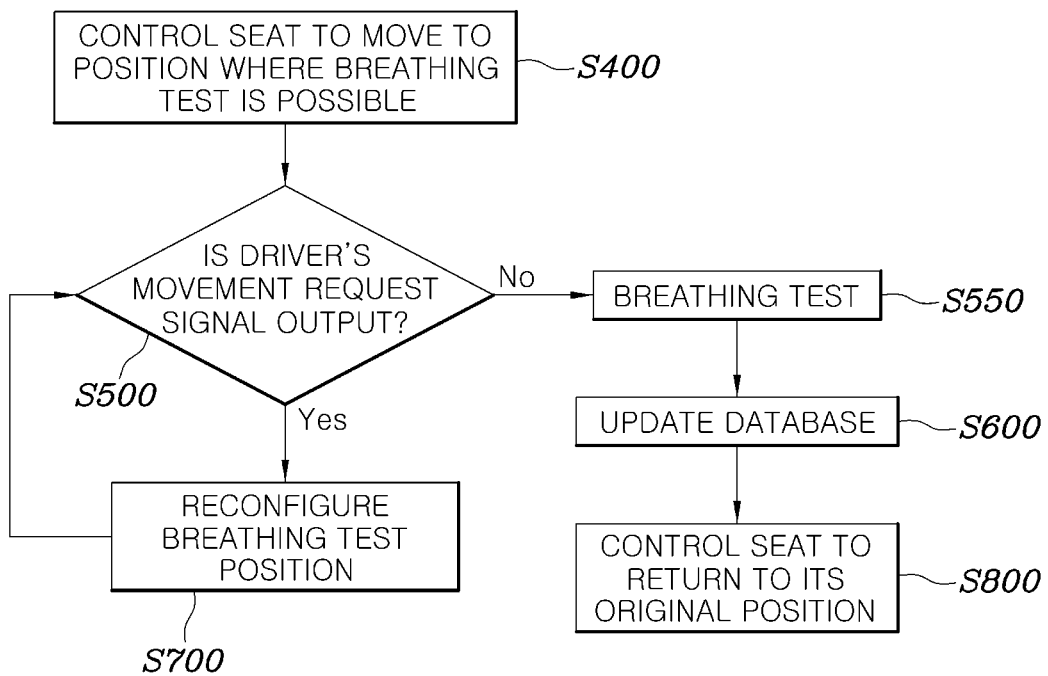
FIG. 3 is a flowchart illustrating a system for determining a driver's inebriation according to another embodiment of the disclosure.
Figure 4:
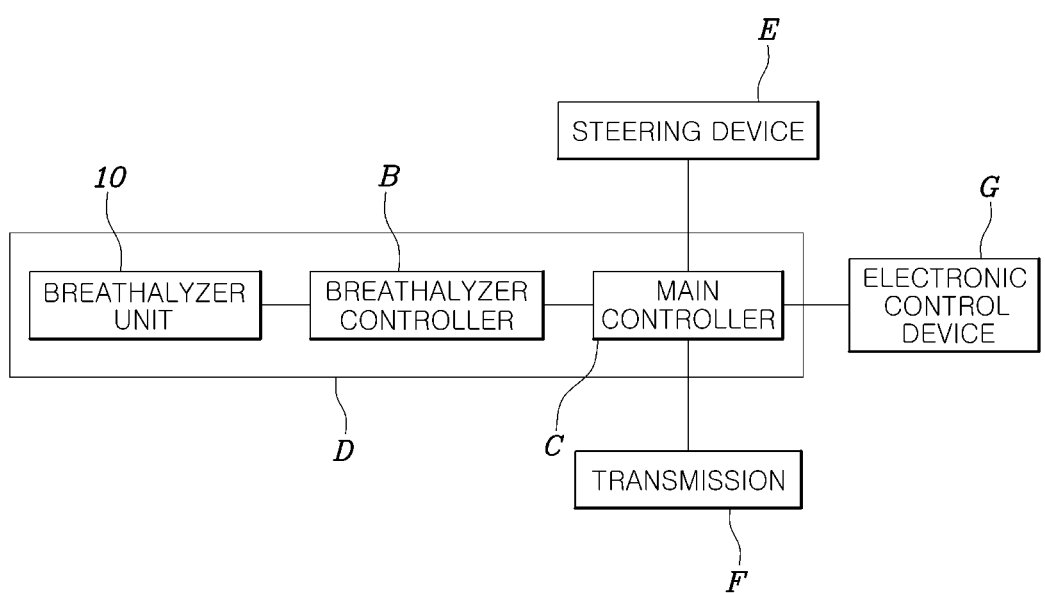
FIG. 4 is a block diagram illustrating an apparatus for determining a driver's inebriation in a vehicle according to a second embodiment of the disclosure.
Figure 5:
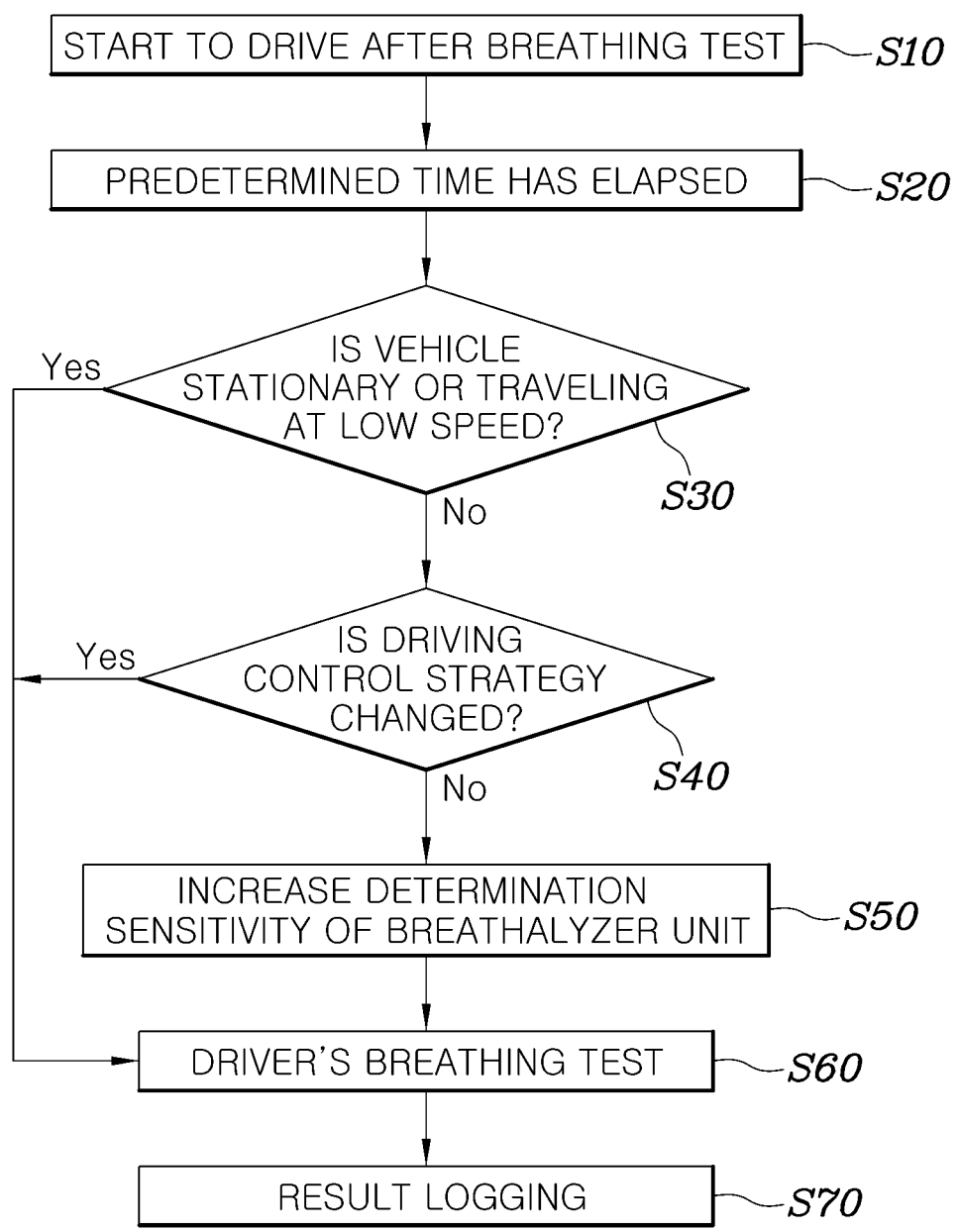
FIG. 5 is a flowchart illustrating a case in which an apparatus for determining a driver's inebriation in the vehicle of FIG. 4 is operated.
Figure 6:
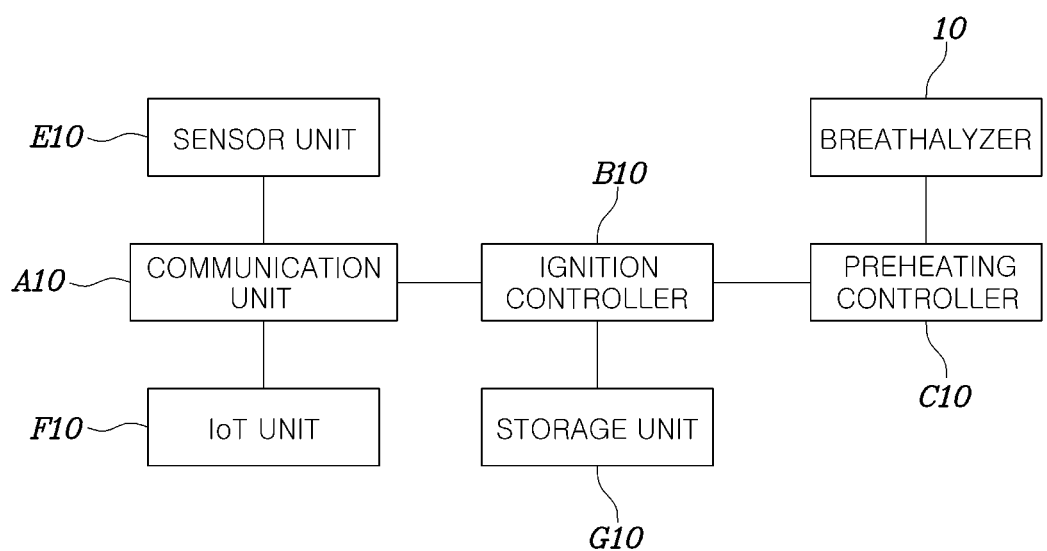
FIG. 6 is a block diagram illustrating a system for determining a driver's inebriation in a vehicle according to a third embodiment of the disclosure.
Figure 7:
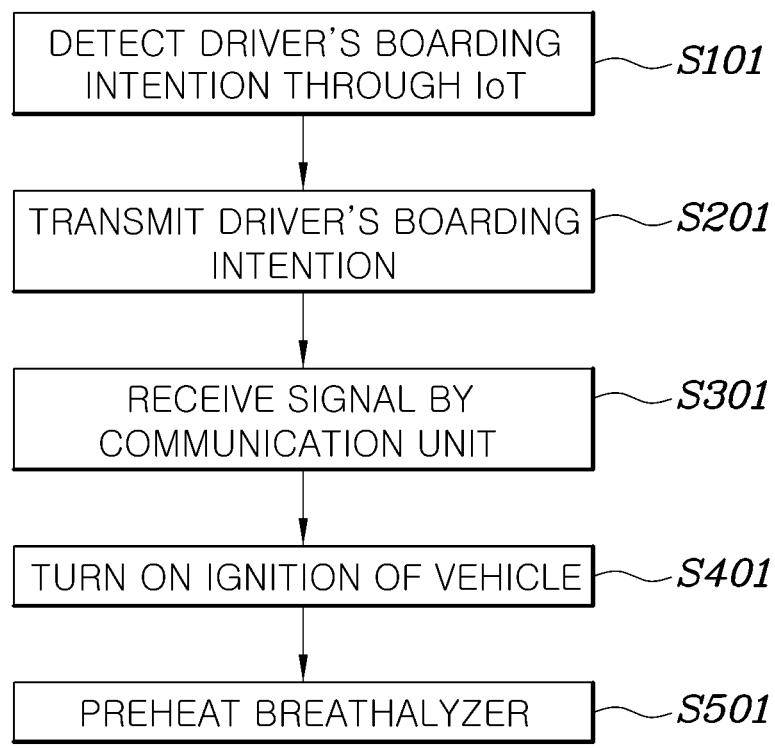
FIG. 7 is a flowchart illustrating a case in which the system for determining a driver's inebriation in the vehicle of FIG. 6 is operated.
Figure 8:
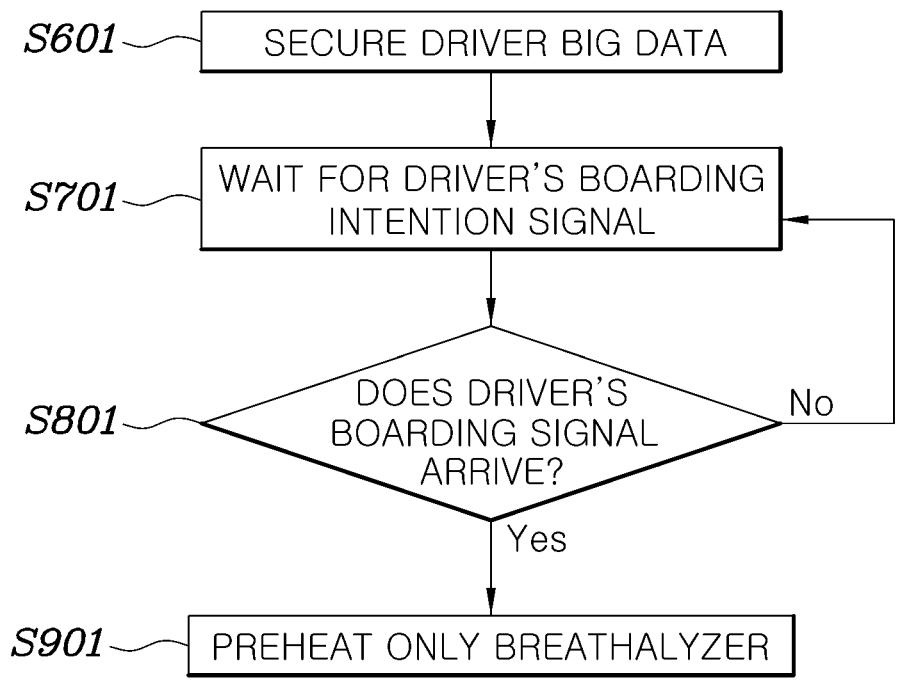
FIG. 8 is a flowchart illustrating a case in which a system for determining a driver's inebriation in a vehicle is operated as another embodiment of the disclosure.
Figure 9:
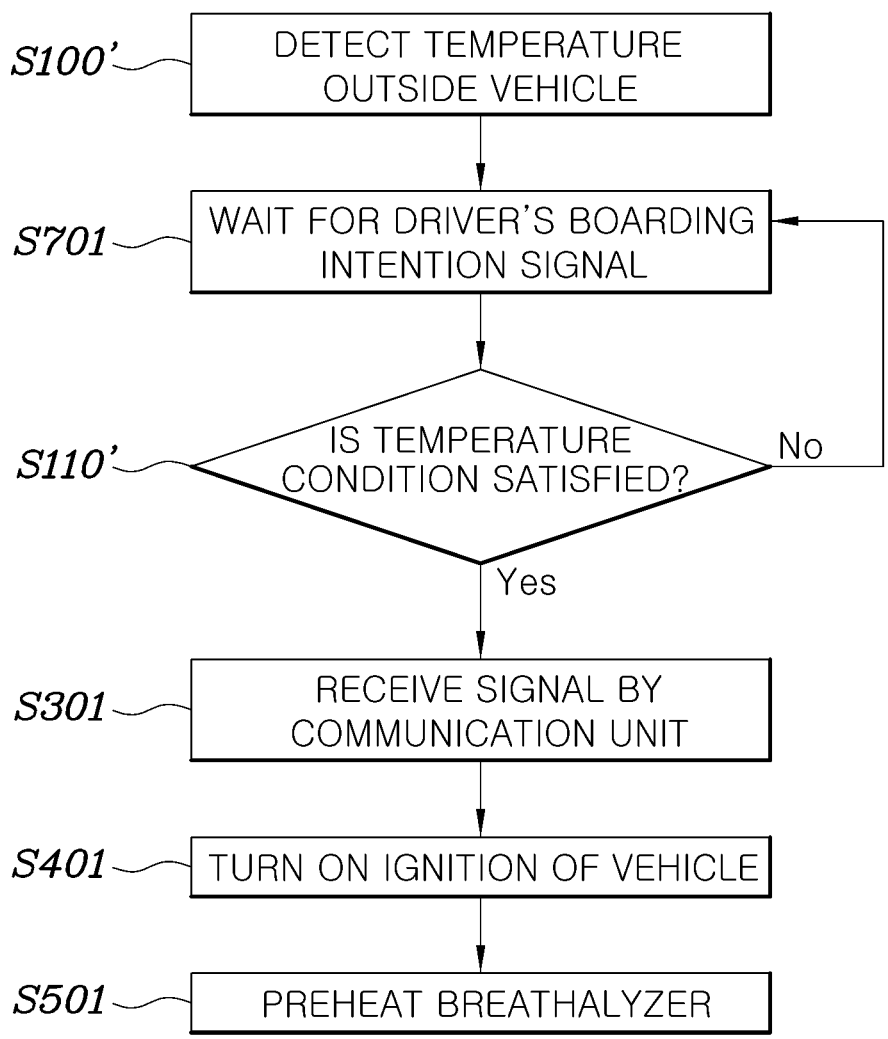
FIG. 9 is a flowchart illustrating a case in which a system for determining a driver's inebriation in a vehicle is operated as still another embodiment of the disclosure.

FIG. 1 is a simplified view illustrating a system for determining a driver's inebriation according to an embodiment of the disclosure, FIG. 2 is a flowchart illustrating a system for determining a driver's inebriation according to an embodiment of the disclosure, and FIG. 3 is a flowchart illustrating a system for determining a driver's inebriation according to another embodiment of the disclosure. FIG. 4 is a block diagram illustrating an apparatus for determining a driver's inebriation in a vehicle according to a second embodiment of the disclosure. FIG. 5 is a flowchart illustrating a case in which an apparatus for determining a driver's inebriation in the vehicle of FIG. 4 is operated. FIG. 6 is a block diagram illustrating a system for determining a driver's inebriation in a vehicle according to a third embodiment of the disclosure. FIG. 7 is a flowchart illustrating a case in which the system for determining a driver's inebriation in the vehicle of FIG. 6 is operated. FIG. 8 is a flowchart illustrating a case in which a system for determining a driver's inebriation in a vehicle is operated as another embodiment of the disclosure. FIG. 9 is a flowchart illustrating a case in which a system for determining a driver's inebriation in a vehicle is operated as still another embodiment of the disclosure.

FIG. 1 is a simplified view illustrating a system for determining a driver's inebriation according to an embodiment of the disclosure. Referring to FIG. 1, the system for determining a driver's inebriation according to an embodiment of the disclosure may include a breathalyzer 10 configured to be provided in an interior space of a vehicle to determine whether the driver is inebriated, through a driver's exhalation; and a controller 30 configured to output a movement request signal for a driver's seat 20 when determination of driver's inebriation by the breathalyzer 10 is required and to control the breathalyzer 10 to start the determination of driver's inebriation when the movement of the driver's seat 20 is completed.

According to the disclosure, whether the driver is inebriated inside a vehicle may be determined and the vehicle may be prevented from starting when the driver is inebriated, thereby fundamentally preventing the occurrence of driver's inebriation. To this end, it is necessary to automatically determine whether the driver is inebriated while the driver is in the vehicle.

The inebriation of the driver is generally determined through measurement of the driver's exhalation, and is determined by measuring an alcohol concentration in the driver's exhalation. Accordingly, it is necessary to determine the driver's inebriation by the driver generating inhalation at a point close to the breathalyzer 10 when determining the driver's inebriation. In an interior structure of the vehicle, the breathalyzer 10 can be installed in a sun visor, a cluster, a steering wheel, etc., but these installation points are generally far apart from the driver's mouth in a state in which the driver is seated on the seat 20, so there is a problem in that the accuracy of determining the driver's inebriation is lowered.

Therefore, the disclosure may automatically move the driver's seat 20 when the driver needs to take a breathalyzer test to board and drive the vehicle so that the determination may be performed at a close distance to the breathalyzer 10.

Specifically, the breathalyzer 10 is to determine whether the driver is inebriated, through the driver's exhalation, and may be provided at various points in front of the driver. The controller 30 of the disclosure controls such a breathalyzer 10 and the driver's seat 20 together. The controller 30 outputs a movement request signal for the driver's seat 20 when determination of driver's inebriation is required by the breathalyzer 10, for example, immediately before the engine of the vehicle is started. That is, before determining a driver's inebriation, in order to increase the accuracy of the measurement, the controller 30 moves the seat 20 first. Next, the controller 30 controls the breathalyzer 10 to start determination of driver's inebriation when the movement of the driver's seat 20 is completed. That is, the controller 30 controls the breathalyzer 10 to start determination of driver's inebriation only when the movement of the seat 20 to the appropriate position is completed.

When the determination of driver's inebriation is started in a state in which the seat 20 is not completely moved, the accuracy of the determination is low, so that the vehicle can be driven despite driver's inebriation state or the vehicle cannot be driven despite the driver being sober. Therefore, the disclosure may prevent the occurrence of accidents or inconvenience to the driver.

The controller 30 may output a signal for returning the driver's seat 20 to its original position when the determination of whether the driver is inebriated is completed.

When the determination of whether the driver is inebriated is completed, the driver is required to adjust the driver's seat 20 to a comfortable position for the driver in order to drive again. Although the driver may directly adjust the position of the seat 20 in order for the driver to return the seat 20 to its original position, in the disclosure, the driver's seat 20 is automatically moved to its original position. Through this, the driver's seat 20 is automatically moved without the need for the driver to directly adjust the driver's seat 20, so that the driver can focus on driving after the determination of whether the driver is inebriated through inhalation is completed, and the driver can reduce the effort of returning the driver's seat 20 to its original position again. Referring to FIG. 3, when the determination of whether the driver is inebriated is completed in the returning of the driver's seat 20 to its original position, operation S800 of outputting the signal for returning the driver's seat 20 to its original position is performed.

The controller 30 may output the movement request signal for the driver's seat 20 through body information of the driver.

The body information of the driver may include information such as the driver's weight and height, and may also include driver's facial information detected by an internal camera 40 of the vehicle, such as the position of the driver's mouth. Breathing test for determining whether the driver is inebriated, through the internal camera 40 attached to the inside of the vehicle, is usually performed through the driver's mouth. Therefore, an optimal position of the driver's seat 20 is obtained by comparing the position of the driver's mouth and the position of the breathalyzer 10. The controller 30 may measure the driver's weight and height to adjust the height of the driver's seat 20 and front and rear distances with the sun visor, the cluster, the steering wheel, etc., and may measure a distance with the breathalyzer 10 in a diagonal direction, whereby it is possible to output the movement request signal for the driver's seat 20 to move the seat to a convenient position for the driver where breathing test is easily performed.

The driver's body information may be input from the controller 30, and the controller 30 may calculate the position of the driver's seat 20 as an optimal position where inebriation of the driver can be determined through measurement of driver's exhalation based on the input body information. Since the calculated position of the driver's seat 20 becomes the optimal position where breathing test can be performed and inebriation of the driver can be determined, the controller 30 outputs the movement request signal to move the seat to the calculated position.

When the driver's body information is stored in a vehicle database 50, the controller 30 may output the movement request signal for the seat 20 to a position stored in the database 50 and matched to the driver.

The driver's body information may be stored in the database 50 of the vehicle, and in the database 50, the movement request signal is output to move the driver's seat 20 to a position calculated by the driver boarding the vehicle, and the seat 20 moves to an optimal position according to the output signal. When the driver's body information is stored in the database 50 of the vehicle, since the driver's body information and the position of the driver's seat 20 are already matched, the driver's seat 20 may be moved to the position stored in the database 50 of the vehicle. Accordingly, it is possible to control the driver's seat 20 to move to the optimal position where breathing test is possible without the need for the controller 30 of the vehicle to detect the driver's body information or the need for the driver to directly input the body information. In this case, when breathing test is performed in a position where breathing test of the driver is possible, the driver's body information and the optimal position of the seat 20 in which breathing test of the driver is possible are stored in the database 50 of the vehicle. By directly outputting the driver's body information stored in the database 50 and the movement request signal for the seat 20 to the stored optimal position of the boarding seat 20, the controller 30 does not need to detect the driver's body information again and the driver's seat 20 immediately moves to its optimal position.

When the position of the seat 20 stored in the database 50 is changed or a new driver is recognized, the controller 30 updates the database 50 after the movement of the driver's seat 20 is completed.

When the driver's body information does not exist in the database 50, the driver's body information is input from the controller 30, and the controller 30 outputs the movement request signal by calculating the position of the driver's seat 20 to the optimal position where the determination of driver's inebriation is possible through the driver's exhalation based on the input body information. In the case of a vehicle used in a vehicle sharing system in which a driver changes frequently or in the case of a chauffeur service, a person other than the main driver of the vehicle will drive the vehicle. In this case, since the driver's body information does not exist in the database 50, the driver's body information is required to be measured through the controller 30 or the driver should directly input his/her own body information. Therefore, when the stored position of the seat 20 is changed or a new driver is recognized, the calculated optimal position of the driver's seat 20 is updated in the database 50 because there is no position matched to the database 50 of the vehicle. Based on the updated database 50 of the vehicle, when the driver subsequently sits on the seat 20, it is possible to output the movement request signal for the seat 20 to move the seat to the position matched to the driver and stored in the database 50 without the need to calculate the position of the boarding seat 20 where breathing test is possible.

When the driver's body information is not stored in the vehicle database 50, the controller 30 may detect the driver's body information or receive the body information directly from the driver to output the movement request signal for the seat 20.

Specifically, the driver's body information may not be stored in the database 50 of the vehicle due to an unspecified driver or a vehicle sharing system. In this case, the controller 30 needs to detect the driver's body information or directly receive the body information from the driver. The optimal position of the driver's seat 20 is calculated using body information sensed by the driver or body information directly input by the driver. Since the movement request signal for the seat 20 is output to move the seat to the calculated optimal position of the driver's seat 20, even if the driver's body information is not stored in the vehicle's database 50, the driver's seat 20 may be moved to the position where breathing test is possible through the driver's exhalation. The controller 30 may output the movement request signal for the seat 20 using average body information when the driver's body information cannot be detected or the body information cannot be directly input from the driver.

As an example of a case in which the driver's body information cannot be detected or the body information cannot be directly input from the driver, there may be cases in which a sensor capable of detecting body information in the controller 30 is broken or it is impossible to input body information because the driver's body is uncomfortable. In this case, instead of detecting body information from the driver or receiving body information directly from the driver, the driver may output the movement request signal to move the seat to the optimal position of the seat 20 in which breathing test is possible using the average body information. Therefore, when the body information cannot be detected from the driver or the body information cannot be directly input from the driver, the seat may be automatically moved to the previously stored position where breathing test on the driver's seat 20 is possible by receiving the average body information from the controller 30.

When it is difficult or inconvenient for the driver to perform breathing test even though the driver moves to the optimal position of the seat 20 where breathing test is possible using the average body information, the movement request signal may be output again or the movement of the driver's seat 20 may be directly controlled.

Although the driver's seat 20 has moved according to the output movement request signal, the controller 30 may output the movement request signal for the driver's seat again according to the driver's request. Although the driver's seat 20 has moved according to the movement request signal, there may be a situation in which a driver's sitting posture on the moved seat 20 is uncomfortable or breathing test is difficult. In this case, the driver outputs the movement request signal for the driver's seat 20 and moves the driver's seat 20 again, thereby outputting the movement request signal for the seat until the driver's sitting posture becomes comfortable or breathing test becomes facilitated. When the driver's sitting posture on the moved seat 20 is uncomfortable or breathing test is difficult, the driver may output the movement request signal for the driver's seat 20 by transmitting a re-movement request signal for the seat 20.

FIG. 2 is a flowchart illustrating a system for determining a driver's inebriation according to an embodiment of the disclosure.

FIG. 3 is a flowchart illustrating a system for determining a driver's inebriation according to another embodiment of the disclosure.

Referring to FIGS. 2 and 3, a method for determining a driver's inebriation according to an embodiment of the disclosure may include calculating (S300), by a controller 30 of a vehicle, a movement position of a driver's seat 20 when determination of inebriation of the driver is required; outputting (S400) a movement request signal for the driver's seat 20 to move the driver's seat 20 to a position calculated by the controller 30 of the vehicle; and determining (S550), by a breathalyzer 10, whether the driver is inebriated through the breath of the driver when the movement of the driver's seat 20 is completed.

In addition, when the driver boards the driver's seat 20, the method may further include determining (S100) whether body information of the driver exists in a database 50.

Referring to FIG. 3, when the determination of inebriation of the driver is completed, the moving of the driver's seat 20 may further include outputting (S800) a signal for returning the driver's seat 20 to its original position.

The calculating of the movement position of the driver's seat 20 may include calculating S300 the movement position through body information of the driver.

The calculating of the movement position of the driver's seat 20 may include using (S150) a position matched to the driver, which is stored in the database 50 when the body information of the driver is stored in the database 50 of the vehicle.

The moving of the driver's seat 20 may further include updating (S600) the database 50 after the movement of the driver's seat 20 is completed, when the position of the seat 20 stored in the database 50 is changed or a new driver is recognized.

The calculating of the movement position of the driver's seat 20 may include calculating (S200) the movement position by detecting the body information of the driver or directly receiving the body information from the driver, when the body information of the driver is not stored in the database 50 of the vehicle.

The calculating of the movement position of the driver's seat 20 may further include calculating (S250) the movement position by using average body information, when the body information of the driver cannot be detected or when the body information of the driver cannot be directly received from the driver.

In addition, the method may further include outputting (S500) the movement request signal for the driver's seat 20 by transmitting a re-movement request signal for the driver's seat, when a driver's sitting posture on the moved seat 20 is inconvenient or breathing test is impossible.

The method may further include reconfiguring (S700) a breathing test position of the driver by transmitting the re-movement request signal for the seat 20 and outputting the movement request signal for the driver's seat, when the driver's sitting posture on the moved seat 20 is inconvenient or the breathing test is impossible.

FIG. 4 is a diagram illustrating an apparatus for determining a driver's inebriation in a vehicle according to a second embodiment of the disclosure. Referring to FIG. 4, the apparatus for determining a driver's inebriation in the vehicle according to the second embodiment of the disclosure may include a breathalyzer unit 10 configured to be installed inside the vehicle and to determine whether the driver is inebriated, through driver's exhalation; a breathalyzer controller B configured to control the operation of the breathalyzer unit 10; and a main controller (C) configured to perform control related to driving of the vehicle, wherein, when it is difficult to determine the driver's inebriation while the vehicle is driven, the main controller (C) changes driving functions or a control strategy for the driving of the vehicle.

According to the disclosure, whether the driver is inebriated may be measured inside the vehicle, and breathing test of the driver may be facilitated by changing the driving functions of the vehicle when it is difficult to determine the inebriation of the driver. To this end, it is necessary to automatically change the configuration of the vehicle or create a situation in which the vehicle is stopped or driving at a low speed, so that the breathing test of the driver can be facilitated while the driver is in the vehicle and driving.

In general, determination of whether the driver is inebriated is performed through the driver's breathing test before the driver gets into the vehicle and starts to drive the vehicle. Accordingly, the determination of whether the driver is inebriated is generally performed while the vehicle is stopped. However, when the driver starts drinking while driving the vehicle, it is difficult to accurately identify driver's inebriation while driving because the driver was determined to be sober while the vehicle was parked. Therefore, even if the driver passes a breathalyzer test while the vehicle is parked, there are cases where it is necessary to periodically take a breathalyzer test while the vehicle is driven.

However, when the driver wants to recheck whether the driver is inebriated while driving the vehicle, it is difficult to authenticate the driver's exhalation and re-determine whether the driver is inebriated, while driving because the vehicle's moving speed is high or the driver is concentrating on driving. In general, the determination of driver's inebriation is performed through the driver's exhalation, and should be performed at a point close to the driver's mouth so that inhalation can be read well. However, since the driver's head is placed in the interior space and the breathalyzer is mounted on the interior structure of the vehicle, the driver must bow his or her head or move the upper body to determine the driver's inebriation. However, as described above, when the driver moves the upper body excessively to determine the driver's inebriation while driving, it will rather interfere with safe driving, so appropriate countermeasures for this are required. In other words, it is necessary to ensure the safety of driving while improving the accuracy of the determination when determining a driver's inebriation while driving.

Therefore, according to the disclosure, when a driver boards a vehicle after breathing test of the driver and then determines driver's inebriation again during driving the vehicle, it is possible for the driver to determine driver's inebriation while maintaining the safety of driving during driving by changing the driving functions of the vehicle.

Specifically, the breathalyzer (C) may determine whether the driver is inebriated, through the driver's exhalation, and the breathalyzer unit 10 may determine whether the driver is inebriated, through the driver's exhalation. The breathalyzer unit 10 may be provided at a position corresponding to the driver's mouth in front of the driver so that the driver's breathing test is facilitated, and the breathalyzer unit 10 may be configured in a non-contact type so that the driver's mouth does not come into contact with the breathalyzer C and breathing test is facilitated. In addition, the breathalyzer controller B may control the operation of the breathalyzer unit 10 for determining whether the driver is inebriated.

The breathalyzer controller B serves to transmit a result value of the driver's blood alcohol concentration measured by the breathalyzer unit 10 for determining whether the driver is inebriated, to the main controller C, which controls the driver to easily perform breathing test while driving. In addition, the breathalyzer controller B controls the operation of the breathalyzer unit 10 for determining whether the driver is inebriated, and may serve to turn off the power of the breathalyzer unit 10, for example, when not determining a driver's inebriation. That is, after completing the determining of whether the driver is inebriated during driving and the controlling of the operation, it is possible to determine whether the driver is inebriated during driving by changing the driving functions for driving of the vehicle or increasing the determination sensitivity of the breathalyzer C.

At this time, the main controller C controls the operation of the breathalyzer controller B and at the same time controls the driving of the vehicle. An apparatus for driving a vehicle includes a powertrain including a steering device E, which is a device for changing a traveling direction of a vehicle, and a transmission F for converting power into rotational force, and chassis components. The operation of the steering device E and the transmission F of the vehicle controlled by the main controller C may be controlled through an electronic control device G of the vehicle. The electronic control device G of the vehicle controls the operation of the steering device E and transmission F connected to the main controller C through electrical signals.

When the driver is unreasonably taking a breathalyzer while driving the vehicle, it may be difficult for the driver to fully concentrate on driving, which may lead to serious accidents. Therefore, in order to prevent this problem, by changing the driving functions so that the vehicle is stopped or driven at a low speed, that is, by activating a semi-autonomous driving function or an autonomous driving function so that the vehicle is stopped or driven at a low speed, it is possible to safely determine whether the driver is inebriated. Alternatively, the driving functions of the vehicle may be changed so that the driving stability can be maintained through autonomous driving even in a middle and high speed range by taking over the control right of the vehicle, thereby facilitating to determine whether the driver is inebriated during driving.

The breathalyzer controller B may control the breathalyzer unit 10 to determine the driver's inebriation when the vehicle is in a stopped state or driving at a low speed.

When the vehicle is stationary or traveling at a low speed, it can be said that the vehicle is running. For example, when the vehicle is stopped at a stop signal of a traffic light or when the driving speed of the vehicle is low, the driver can facilitate breathing test without changing the driving functions of the vehicle. In this case, since the driver does not have to highly concentrate on driving, the driver may determine his or her inebriation.

The breathalyzer controller B may control the breathalyzer unit 10 to increase the determination sensitivity when the driver repeatedly fails to determine driver's inebriation.

When the driver determines whether the driver is inebriated, through the breathalyzer unit 10, there may be cases in which a sufficient amount of inhalation is not input to the breathalyzer unit 10 to determine the driver's blood alcohol concentration or driver's inebriation cannot be measured due to the driver's incorrect posture. In this case, by increasing the sensitivity of the breathalyzer unit 10 in the breathalyzer unit 10 of the breathalyzer C, even when the amount of inhalation of the driver input to the breathalyzer unit 10 is small, it can be possible to determine driver's inebriation. In addition, in a case in which the vehicle is not stopped or driving at low speed, even if it is difficult to authenticate the driver's exhalation even after changing to a strategy such as autonomous driving mode or driving assistance mode, it is possible to increase the determination sensitivity of the breathalyzer unit 10 to control the determination of driver's inebriation to be facilitated.

The breathalyzer controller B may increase the determination sensitivity by adjusting the output of the fan of the breathalyzer unit 10 and the air conditioning of the vehicle.

As a method of increasing the determination sensitivity of the breathalyzer unit 10 in the breathalyzer controller B, there is a method of increasing the determination sensitivity of inhalation required to determine the driver's blood alcohol concentration. A method of increasing the sensitivity of the driver's exhaled inhalation by the breathalyzer unit 10 is to increase the amount of inhalation received from the breathalyzer unit 10. In order to increase the amount of input inhalation, it is possible to increase the amount of the driver's exhalation input from the vehicle by increasing the output of the fan located in the breathalyzer unit 10 to increase the amount of inhalation of the driver in the breathalyzer unit 10 or by controlling the air conditioning of the vehicle.

The main controller C may perform driving prohibition control so that the vehicle is not driven when the driver's inebriation is determined, and may not perform driving prohibition control when it is difficult to determine the driver's inebriation while driving.

When there is a problem with the vehicle or there is a risk that the driver may arbitrarily touch other devices of the vehicle, the driver's safety can be secured by applying the driving prohibition control to the vehicle, such as turning off the vehicle's ignition in the electronic control device G of the vehicle or locking the transmission F or the steering device E. However, in the process of determining whether the driver is inebriated, through breathing test during driving, there may be a case in which breathing test may fail or the driver's blood alcohol concentration may be measured to be high. In this case, when the driving prohibition control is applied to turn off the vehicle's ignition or the transmission F or steering device E is locked so that the driver cannot control the vehicle, it may be difficult to drive when the driver is driving the vehicle and the driver may be in danger. Therefore, even if the driver's breathing test fails or the driver's blood alcohol level is measured to be high, the vehicle's driving prohibition control should not be performed.

The main controller C may change the driving functions of the vehicle to an autonomous driving mode or a driving assistance mode when it is difficult to determine the driver's inebriation during vehicle's driving.

When the driver intends to determine driver's inebriation through breathing test during driving, the driver may easily determine his or her inebriation in the case of the vehicle being stopped or driving at a low speed. However, when the vehicle is not in a stopped situation or is not in a low-speed driving situation, the driver may change the driving functions of the vehicle, so as to facilitate the determination of driver's inebriation through the driver's breathing test. In this case, the driving functions of the vehicle includes an autonomous driving mode or a driving assistance mode. For example, a smart cruise control system that adjusts the speed by adjusting a distance from a preceding vehicle on a highway can be said to be of a type of driving assistance mode.

The breathalyzer unit 10 may determine whether the driver is inebriated, through the driver's exhalation in a non-contact manner with the driver.

Although the breathalyzer unit 10 of the breathalyzer C can be configured to determine the driver's inebriation in a contact manner, the breathalyzer unit 10 may be configured in a non-contact manner to facilitate breathing test of the driver even from a long distance. By configuring the breathalyzer unit 10 of the breathalyzer C in a non-contact manner with the driver, the driver may determine driver's inebriation while focusing on driving while looking straight ahead even when the vehicle is stationary or driving at low speed.

FIG. 5 is a flowchart illustrating a case in which a system for determining a driver's inebriation in the vehicle of FIG. 4 is operated.

Referring to FIG. 5, a method for determining a driver's inebriation using an apparatus for determining a driver's inebriation in a vehicle of claim 1 may include determining (S10), by a main controller C or a breathalyzer controller B, whether determination of inebriation of the driver is possible during driving of the vehicle; determining (S60) driver's inebriation through the breathalyzer unit 10 when the determination of inebriation of the driver is possible; and changing (S40) driving functions of the vehicle through the main controller C when it is difficult to determine the driver's inebriation.

In addition, the determining of whether the determination of driver's inebriation is possible may further include controlling (S30), by the breathalyzer controller B, the breathalyzer unit 10 to determine inebriation of the driver when the vehicle is stationary or traveling at a low speed.

The determining (S10), by the main controller C or the breathalyzer controller B, of whether determination of inebriation of the driver is possible during the driving of the vehicle may further include requiring (S20) breathing test of the driver when a predetermined time has elapsed since the vehicle has been driven.

The method may further include controlling (S50), by the breathalyzer controller B, the breathalyzer unit 10 to increase determination sensitivity when the driver repeatedly fails to determine driver's inebriation.

The controlling of the breathalyzer unit 10 may be adjusting an output of a fan of the breathalyzer unit 10 and air conditioning of the vehicle to increase the determination sensitivity.

After the determining of whether the determination of driver's inebriation is possible, the method may further include performing driving prohibition control to prevent the vehicle from being driven when the inebriation of the driver is determined, and not performing the driving prohibition control when it is difficult to determine the driver's inebriation during driving.

The determining of whether the determination of inebriation of the driver is possible may be changing the driving functions of the vehicle to an autonomous driving mode or a driving assistance mode when it is difficult to determine the driver's inebriation during the driving of the vehicle.

The determining of the driver's inebriation may be determining whether the driver is inebriated, through breath of the driver in a non-contact manner with the driver.

In addition, when the determination of inebriation of the driver is possible, the determining (S60) of the driver's inebriation through the breathalyzer unit 10 may further include logging (S70) a result value after determining the driver's inebriation.

FIG. 6 is a diagram illustrating a system for determining a driver's inebriation in a vehicle according to a third embodiment of the disclosure. Referring to FIG. 6, a communication unit A10 configured to remotely receive a boarding intention signal of a driver; and a preheating controller C10 configured to control a breathalyzer 10 of the vehicle to be preheated when the boarding intention signal of the driver is received by the communication unit A10.

According to the disclosure, preheating of the breathalyzer 10 may be required in order to determine whether the driver is inebriated inside the vehicle, so that the breathalyzer 10 may be preheated before the driver boards the vehicle, thereby facilitating to determine inebriation of the driver. To this end, it is important to receive the driver's boarding intention signal because it is necessary to preheat the breathalyzer 10 by turning on the ignition of the vehicle before the driver boards the vehicle.

In general, inebriation of the driver is determined through measurement of driver's breathing test before the driver gets in the vehicle and drives. In this case, in a state where sufficient preheating is made while the power of the breathalyzer 10 is turned on, determination should be performed. When sufficient preheating of the breathalyzer 10 is not made, the result value of the driver's inebriation may be different or may come out as an inaccurate result. Accordingly, it is essential to preheat the breathalyzer 10 for determining whether the driver is inebriated, through the driver's exhalation. In order to preheat the breathalyzer 10, a process of turning on the power of the breathalyzer 10 in the state in which the driver boards the vehicle and starts the engine to drive is required. This process requires a considerable amount of time before the driver drives the vehicle, causing the driver to feel uncomfortable. To this end, when the driver can detect the boarding intention signal of the vehicle the driver wants to drive, it is possible to preheat the vehicle by turning on the ignition in advance and also turning on the power of the vehicle's breathalyzer 10.

Therefore, according to the disclosure, a boarding intention signal indicating that the driver will board the vehicle before the driver gets into the vehicle and drives may be received, and the ignition of the vehicle may be turned on in advance based on the received boarding intention signal of the driver and preheating may be made in advance by turning on the breathalyzer 10 of the vehicle to enable inebriation of the driver to be rapidly determined.

Specifically, the communication unit A10 remotely receives the driver's boarding intention signal. It is possible to receive the boarding intention signal detected through an Internet of Things (IoT) unit F10 that transmits the boarding intention signal to a driver's mobile device and the vehicle communication unit A10, as one of vehicle electronic control devices disposed inside the vehicle. As one of the electronic control devices of the vehicle, the communication unit A10 may detect not only the driver's boarding intention signal but also signals necessary for the driver's vehicle driving. The preheating controller C10 may be controlled to preheat the breathalyzer 10 of the vehicle when the driver's boarding intention signal is received by the communication unit A10. The preheating controller C10 serves to control the preheating of the breathalyzer 10 of the vehicle. After the driver's boarding intention signal is received from an ignition controller B10, the ignition of the vehicle is turned on. In this case, the vehicle's ignition is turned on through the ignition controller B10 and then the preheating of the breathalyzer 10 is controlled by the preheating controller C10 disposed inside the electronic control device or the breathalyzer 10 of the vehicle. In this case, the driver's boarding intention signal is remotely transmitted to the communication unit A10 through a sensor unit E10 that detects the temperature outside the vehicle or the IoT unit F10 that detects the driver's boarding intention through the driver's mobile device.

When the driver does not turn on the ignition of the vehicle or the vehicle's breathalyzer 10 is not preheated in a situation in which the driver admits, before the driver boards the vehicle, that the determination of driver's inebriation is necessary, the driver may experience inconvenience as it takes time each time he or she get into the vehicle. Therefore, in order to prevent this problem, by turning on the ignition of the vehicle before the driver gets into the vehicle to preheat the breathalyzer 10, or by preheating the breathalyzer 10 in a state where the ignition of the vehicle is not turned on, it is possible to facilitate determining inebriation of the driver.

The system for determining a driver's inebriation may further include the ignition controller B10 configured to turn on the ignition of the vehicle after the driver's boarding intention signal is received, and the preheating controller C10 may control the vehicle's breathalyzer 10 to be preheated after the ignition of the vehicle is turned on.

The breathalyzer 10 may be supplied with electricity necessary for preheating the breathalyzer 10 through the vehicle's battery. In this case, the vehicle's battery is used to supply electricity necessary for preheating the breathalyzer 10, and after the driver's boarding intention signal is received, the electricity supply is smoothly performed after the ignition controller B10 turns on the ignition of the vehicle. After receiving the driver's boarding intention signal from the communication unit A10, the ignition controller B10 may turn on the ignition of the vehicle.

The communication unit A10, the ignition controller B10, and the preheating controller C10 may be installed in the vehicle.

For the driver's determination of inebriation, the breathalyzer 10 should be disposed in a place where the driver can easily determine driver's inebriation, and thus the system for determining a driver's inebriation should be installed in the vehicle to facilitate the driver's determination of inebriation. In this case, the communication unit A10, the ignition controller B10, and the preheating controller C10 are installed inside the vehicle's electronic control device, or the driver's boarding intention signal is received from the inside of the breathalyzer 10 so that preheating of the breathalyzer 10 may be performed.

The apparatus may further include the IoT unit F10 that detects the driver's boarding intention through the driver's mobile device and transmits the boarding intention signal to the communication unit A10 of the vehicle.

Since the driver carries a mobile device, the driver's boarding intention signal is detected along with the driver's mobile device and the IoT installed in the driver's activity space such as home or office. The driver's boarding intention signal may be transmitted according to conditions for transmitting the driver's boarding intention signal configured by the IoT itself, such as when the driver's mobile device moves away from the IoT installed inside the driver's activity space, or when the driver leaves the activity space.

When the driver's boarding intention signal is received by the communication unit A10, the ignition controller B10 may preheat only the breathalyzer 10 of the vehicle in the preheating controller C10 without turning on the ignition of the vehicle.

The driver may not want to turn on the ignition of the vehicle because the vehicle is parked indoors and does not want to idle. In this case, it is possible to preheat only the breathalyzer 10 in the preheating controller C10 without turning on the ignition of the vehicle by the ignition controller B10. Through the configuration in which only the breathalyzer 10 can be preheated without turning on the ignition of the vehicle through the driver's mobile device, only the breathalyzer 10 of the vehicle can be preheated even when the driver's boarding intention signal arrives.

When only the breathalyzer 10 of the vehicle is preheated by the preheating controller C10, but the driver does not perform determination of inebriation even after a certain period of time has elapsed, the breathalyzer 10 may enter a sleep state.

Since the vehicle's breathalyzer 10 uses the vehicle's battery, when the driver does not board even after the driver's boarding intention signal arrives, or when the driver does not board and does not perform determination of inebriation, the breathalyzer 10 remains turned on. When the vehicle is an electric vehicle, the mileage of the charged vehicle may be shortened or the vehicle battery may be discharged. Therefore, when the driver's boarding intention signal is received by the communication unit A10 and the driver does not perform determination of inebriation even though the preheating controller C10 preheats the vehicle's breathalyzer 10, it is necessary to make the breathalyzer 10 enter a sleep state to save power. When the breathalyzer 10 enters the sleep state, the preheating controller C10 does not preheat the breathalyzer 10 so that the vehicle's battery is hardly consumed.

The apparatus may further include a data storage (or storage unit) G10 configured to store a driver's boarding intention condition (or pattern) including a driver's location or a vehicle's location or time, and the ignition controller B10 may turn on the ignition of the vehicle when the boarding intention pattern stored in the data storage G10 is satisfied.

By securing driver's big data in the vehicle, it is possible to determine in advance the time for the driver to board and determine driver's inebriation through the breathalyzer 10. In this case, the driver's big data refers to the driver's boarding intention pattern including the driver's location or the location or time of the vehicle. The driver's boarding intention pattern may include a driver's parking location and a boarding location and may also include data according to the driver's life pattern, such as a boarding time.

The data storage G10 stores the driver's boarding intention pattern including the big data. The ignition controller B10 is able to preheat the vehicle's breathalyzer 10 according to the boarding intention pattern stored in the data storage G10 before the driver boards. Therefore, the data storage G10 can learn the driver's boarding intention pattern including the driver's location or the location or time of the vehicle to vary the preheating time of the breathalyzer 10 for each driver of the vehicle.

When the driver's boarding intention signal is not received by the communication unit A10, the driver's boarding intention signal may be waited for.

The communication unit A10 receives the driver's boarding intention signal when the boarding intention pattern stored in the data storage G10 is satisfied, and turns on the vehicle's ignition when the boarding intention pattern is satisfied. In this case, the driver's boarding intention signal may not be transmitted to the communication unit A10. In this case, the IoT unit F10 may not be able to detect the driver's boarding intention through the driver's mobile device or transmit the boarding intention signal to the communication unit A10 of the vehicle. In this case, the communication unit A10 can wait for the driver's boarding intention signal, and the vehicle's breathalyzer 10 may be preheated by the preheating controller C10 only when the driver's boarding intention signal arrives.

The communication unit A10 may remotely receive the driver's boarding intention signal through ultra-wideband wireless technology.

The ultra-wideband wireless technology called ultra-wideband (UWB10) is based on general power and has a maximum transmission distance of about 10 m. The apparatus may further include the data storage G10 configured to store the driver's boarding intention pattern including the driver's location or the vehicle's location or time by using the ultra-wideband wireless technology. The ignition controller B10 turns on the ignition of the vehicle when the boarding intention pattern stored in the data storage G10 is satisfied through the device equipped with the ultra-wideband wireless technology mounted on the vehicle and the mobile device, and then the breathalyzer 10 may be preheated by the preheating controller C10. Through the ultra-wideband wireless technology, the driver's location can be identified more accurately, and thus the vehicle can be controlled quickly.

The apparatus may further include a sensor unit E10) configured to sense a vehicle temperature condition by detecting the temperature outside the vehicle, the communication unit A10 may receive, when the vehicle temperature condition sensed by the sensor unit E10) is satisfied, the driver's boarding intention signal and the ignition of the vehicle may be turned on by the ignition controller B10.

When it is determined that the temperature outside the vehicle is lower than a certain temperature configured by the driver or the vehicle, the driver's boarding intention pattern including the driver's location or the vehicle's location or time may be stored in the data storage G10, and the ignition controller B10 may turn on the ignition ahead of the time to turn on the ignition configured when the boarding intention pattern stored in the data storage G10 is satisfied, or the preheating of the vehicle's breathalyzer 10 by the preheating controller C10 may be possible. When the temperature outside the vehicle is low, it takes more time for the driver to start and drive the vehicle or perform determination of inebriation through the breathalyzer 10 than when the outside temperature is high. Therefore, when the sensor unit E10 detects the temperature outside the vehicle and determines that the outside temperature is low, the vehicle may be started in advance to preheat the vehicle or to make it easier to determine driver's inebriation.

Before turning on the ignition of the vehicle in the ignition controller B10, the breathalyzer 10 in the preheating controller C10 can be controlled to be preheated.

When it is determined that the temperature outside the vehicle is lower than a certain temperature configured by the driver or the vehicle, the data storage G10 may store the driver's boarding intention pattern including the driver's location or vehicle location or time, and according to the driver's boarding intention pattern in the preheating controller C10, only the breathalyzer 10 of the vehicle can be preheated. There are cases where the driver wants to use only the breathalyzer 10 according to the temperature condition before turning on the ignition of the vehicle. In this case, even when the sensor unit E10 determines that the temperature condition is low due to the low temperature outside the vehicle, the preheating controller C10 can be controlled to preheat the breathalyzer 10. After controlling the preheating controller C10 to preheat the breathalyzer 10, when the driver wants, it is possible to turn on the ignition of the vehicle by the ignition controller B10.

FIG. 7 is a flowchart illustrating a case in which the system for determining a driver's inebriation in the vehicle of FIG. 6 is operated.

Referring to FIG. 7, a method for determining a driver's inebriation in a vehicle may include remotely receiving (S201), by the communication unit A10 of the vehicle, a driver's boarding intention signal; and controlling (S501), by the preheating controller C10 of the vehicle, the breathalyzer 10 to be preheated when the driver's boarding intention signal is received by the communication unit A10.

Before the controlling (S501), by the preheating controller C10 of the vehicle, of the breathalyzer 10 to be preheated, the method may further include turning on (S401) the ignition of the vehicle when the driver's boarding intention signal is received by the ignition controller B10.

In addition, before the turning on (S401) of the ignition of the vehicle when the driver's boarding intention signal is received by the ignition controller B10, the method may further include receiving (S301), by the communication unit A10, the driver's boarding intention signal after the remotely receiving (S201) of the driver's boarding intention signal by the communication unit A10 of the vehicle.

Before the remotely receiving (S201) of the driver's boarding intention signal, the method may further include detecting, by the IoT unit F10, a driver's boarding intention through a driver's mobile device and transmitting (S101) the boarding intention signal to the communication unit A10 of the vehicle.

FIG. 8 is a flowchart illustrating a case in which a system for determining a driver's inebriation in a vehicle is operated as another embodiment of the disclosure.

Referring to FIG. 8, before the remotely receiving (S201) of the driver's boarding intention signal, the method may further include storing (S601), by the data storage G10, a driver's boarding intention pattern including a driver's location or a vehicle's location or time; and turning on the ignition of the vehicle when the boarding intention pattern stored in the data storage G10 is satisfied by the ignition controller B10.

FIG. 9 is a flowchart illustrating a case in which a system for determining a driver's inebriation in a vehicle is operated as still another embodiment of the disclosure.

Referring to FIG. 9, the method may further include sensing (S101'), by the sensing unit E10, a temperature outside the vehicle to sense a vehicle temperature condition.

After the sensing (S101'), by the sensing unit E10, of the vehicle temperature condition by sensing the temperature outside the vehicle, the method may further include waiting for (S701), by the communication unit A10, the driver's boarding intention signal according to the vehicle temperature condition sensed by the sensor unit E10.

After the waiting for (S701), by the communication unit A10, of the driver's boarding intention signal according to the vehicle temperature condition sensed by the sensing unit E10, the method may further include determining (S110') whether the vehicle temperature condition sensed by the sensing unit E10) is satisfied.

In addition, after the waiting for (S701), by the communication unit A10, of the driver's boarding intention signal, the method may further include determining (S801) whether the driver's boarding signal arrives.

After the waiting for (S701), by the communication unit A10, of the driver's boarding intention signal and after the determining (S801) of whether the driver's boarding signal arrives, the method may further include preheating (S901), by the preheating controller C10, only the breathalyzer 10 without turning on the ignition of the vehicle by the ignition controller B10.

What is claimed is:

1. A system for determining a driver's inebriation in a vehicle, comprising:
a breathalyzer positioned at a vehicle and configured to determine a driver's inebriation based on the driver's exhalation; and
a controller configured to:
assess whether a determination of the driver's inebriation is required;
in response to assessing that the determination of the driver's inebriation is required, output a movement request signal configured to cause a driver's seat in the vehicle to be moved; and
upon determining that the driver's seat has been moved in response to the movement request signal, control the breathalyzer to start the determination of the driver's inebriation.

2. The system of claim 1, wherein the controller is configured to generate the movement request signal based on the driver's body information.

3. The system of claim 2, wherein:
the vehicle includes a data storage storing the driver's body information and a seat position associated with the driver, and
the movement request signal is configured to cause the driver's seat to be moved to the seat position.

4. The system of claim 2, wherein:
the vehicle includes a data storage, and
the controller is further configured to:
determine whether the data storage stores the driver's body information; and
in response to determining that the data storage does not store the driver's body information, perform:
detecting or receiving the driver's body information; and
generating the movement request signal based on the detected or received driver's body information.

5. The system of claim 2, wherein:
the vehicle includes a data storage, and
the controller is further configured to:
determine whether the driver's body information is detected, stored in the data storage, or received from the driver; and
in response to determining that the driver's body information is not detected,
stored in the data storage, or received, generating the movement request signal based on average or prescribed body information.

6. The system of claim 1, wherein:
the controller comprises (1) a breathalyzer controller configured to control the breathalyzer unit, and (2) a main controller configured to control driving functions of the vehicle, and
the main controller is configured to assess whether the driver's inebriation is determinable, and, in response to assessing that the driver's inebriation is not determinable, change the driving functions of the vehicle.

7. The system of claim 6, wherein the controller is configured to control the breathalyzer unit to determine the driver's inebriation when the vehicle is stopped or moving at a speed lower than a predetermined speed.

8. The system of claim 6, wherein:
the breathalyzer unit includes a fan, and the vehicle includes an air conditioning unit, and
the controller is configured to:
detect that that the controller has repeatedly failed the determination of the driver's inebriation; and
adjust an output of the fan or the air conditioning unit.

9. The system of claim 6, wherein the main controller is configured to change the driving functions of the vehicle to an autonomous driving mode or a driving assistance mode when the driver's inebriation is not determinable.

10. The system of claim 1, further comprising:
a communication unit configured to receive a driver boarding intention signal; and
a preheating controller configured to control the breathalyzer to be preheated in response to the communication unit receiving the driver's boarding intention signal.

11. The system of claim 10, further comprising an ignition controller configured to turn on an ignition of the vehicle in response to the communication unit receiving the driver boarding intention signal,
- wherein the preheating controller is configured to control the breathalyzer to be preheated after the ignition of the vehicle is turned on.

12. The system of claim 10, further comprising an ignition controller configured to turn on an ignition of the vehicle,
- wherein the ignition controller is configured not to turn on the ignition of the vehicle in response to the communication unit receiving the driver's boarding intention signal, and
- wherein the preheating controller is configured to preheat the breathalyzer in response to the communication unit receiving the driver's boarding intention signal.

13. The system of claim 11, further comprising a data storage storing the driver boarding intention condition including driver location, or vehicle location or time,
- wherein the ignition controller is configured to turn on the ignition of the vehicle when the driver boarding intention condition is satisfied.

14. The system of claim 13, further comprising a sensing unit configured to sense a temperature outside the vehicle,
- wherein the data storage stores a vehicle temperature condition, and
- wherein the ignition controller is configured to turn on the ignition of the vehicle in response to (1) the sensed temperature satisfying the vehicle temperature condition, and (2) the communication unit receiving the driver boarding intention signal.

15. A method for determining a driver's inebriation, comprising:
- assessing whether a determination of a first driver's inebriation is required;
- in response to assessing that the determination of the first driver's inebriation is required, calculating a movement position of a driver's seat in a vehicle;
- moving the driver's seat to the calculated movement position; and
- in response to detecting that the driver's seat has moved to the calculated movement position, determining, using a breathalyzer, the first driver's inebriation based on first driver inhalation.

16. The method of claim 15, wherein calculating the movement position of the driver's seat comprises calculating the movement position based on the first driver's body information.

17. The method of claim 16, wherein calculating the movement position of the driver's seat comprises using a first movement position stored in a data storage and associated with the first driver.

18. The method of claim 17, further comprising:
- detecting a change to the movement position or recognizing a second driver in the vehicle; and
- updating the data storage to include a second movement position based on the detected change to the movement position or the second driver's body information.

19. The method of claim 16, further comprising:
- detecting that the first driver's body information is not stored in a data storage of the vehicle; and
- detecting or receiving the first driver's body information.

20. The method of claim 15, further comprising:
- determining whether the first driver is in a situation that allows a determination of the first driver's inebriation while driving the vehicle; and
- changing driving functions of the vehicle when it is determined that the first driver is not in a situation allowing the determination of the first driver's inebriation.

* * * * *